Dec. 19, 1939.   J. CHRISTIAN   2,184,071
FREEWHEELING DEVICE
Filed July 2, 1931   2 Sheets-Sheet 1
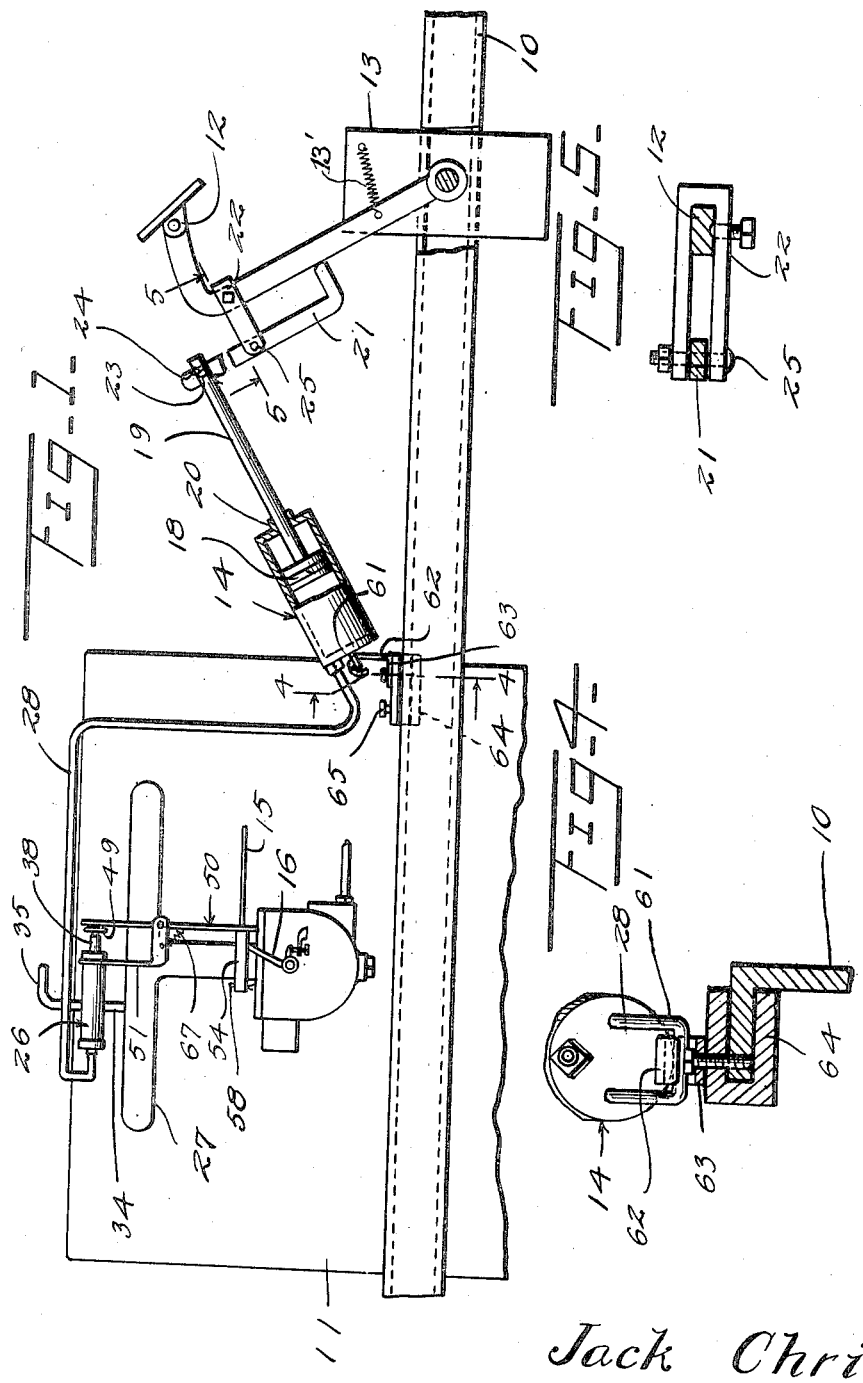
Inventor
Jack Christian
By Frank H. Renand
Attorney

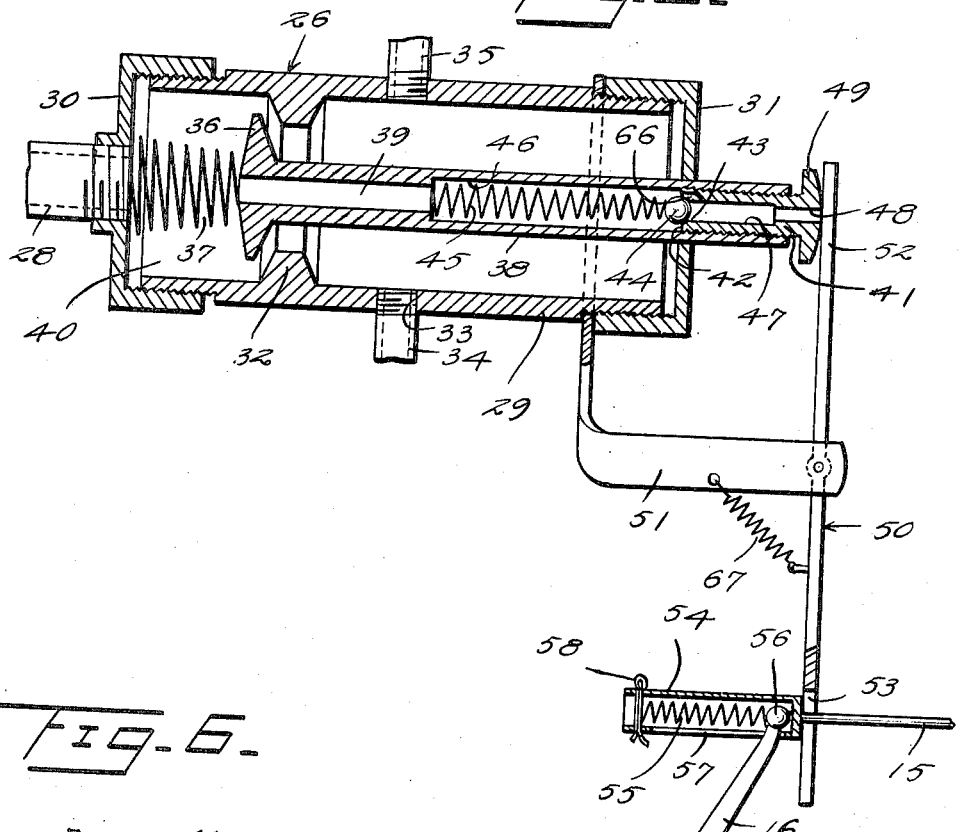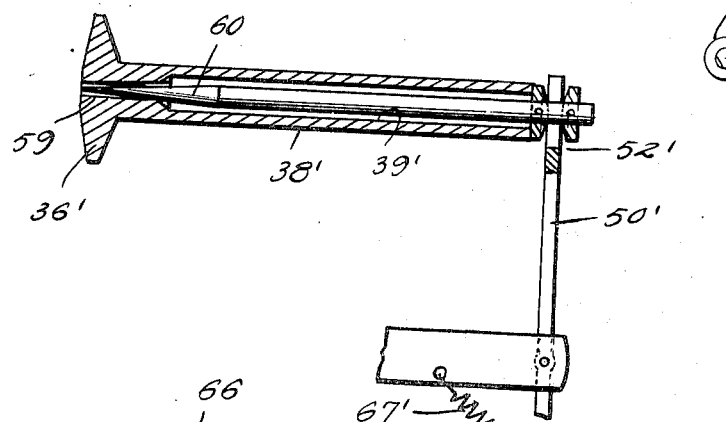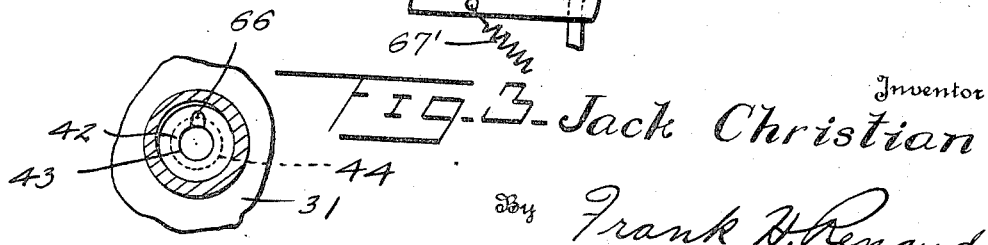

Patented Dec. 19, 1939

2,184,071

UNITED STATES PATENT OFFICE 2,184,071

FREEWHEELING DEVICE

Jack Christian, Sanford, Fla.

Application July 2, 1931, Serial No. 548,433

16 Claims. (Cl. 192—.01)

This invention relates to free wheeling devices, and more particularly to an attachment which may be mounted on any vehicle or motor operated conveyance so as to permit movement of the vehicle without dragging on the drive shaft or transmission.

An object of the invention is to provide means which may be readily attached or positioned on the present parts of a motor operated vehicle which will not interfere with the normal use of the present parts by means of which the clutch will be moved into released position upon release of the carbureter throttle.

Another object of this invention is to provide a device of this kind which will effect the gradual clutching of the clutch mechanism when the throttle is moved into open position.

A further object of this invention is to provide a device of this kind which is exceedingly simple in construction so that it may be mounted on any conventional type of vehicle by an ordinary mechanic, the device being such as not to require the drilling of any holes or the like in any of the present parts of the vehicle.

A still further object of this invention is to provide a clutch operating member which is so mounted on the vehicle that it will not interfere with the normal use of the clutch pedal.

Still another object of this invention is to provide a clutch operating device of this kind which may be attached to any type of mechanism employing an internal combustion engine and a clutch which is associated therewith for operatively connecting the engine with a driven shaft.

The above and various other objects and advantages of this invention will in part be described in and in part be understood from the following detailed description of the present preferred embodiment, the same being illustrated in the accompanying drawings, wherein:

Figure 1 is a detail side elevation partly broken away of a device constructed according to the preferred embodiment of this invention;

Figure 2 is an enlarged longitudinal section of the automatic valve;

Figure 3 is an enlarged sectional view taken through the air valve;

Figure 4 is an enlarged sectional view taken on the line 4—4 of Figure 1;

Figure 5 is a sectional view taken on the line 5—5 of Figure 1, and

Figure 6 is a longitudinal section partly in detail of a modified form of the valve.

Referring to the drawings wherein like numerals of reference designate corresponding parts throughout the several views, the numeral 10 designates generally a vehicle frame having positioned therein a motor 11 of the internal combustion type which has a rockable clutch pedal 12 engaged with conventional clutch mechanism whereby the engine or motor 11 may be operatively connected to a drive shaft for movement of the vehicle or conveyance carried by the frame 10. In order to effect automatic declutching of the clutch 13, I have provided a clutch operating member, generally designated as 14, which is connected to the clutch pedal 12 for movement of the clutch pedal upon release of the foot throttle 15 which is connected to the rock arm 16 of the carbureter of the motor 11.

This clutch operating member 14 comprises an elongated cylindrical member 17 which is closed at each end and provided with a slidable plunger 18 disposed therein, which has a stem 19 extending outwardly through an opening 20 in one end of the wall of the cylinder 17. This stem or shaft 19 is connected to a clutch lever 21 which is mounted on the clutch pedal 12 by means of a clamp 22. The clutch lever 21 is connected to the stem or shaft 19 by means of a pin 23 which is held in an opening adjacent the upper end of the clutch lever 21 by means of a cotter pin 24 or the like, which cotter pin permits the ready disconnection of the shaft 19 from the clutch lever 21.

The clamp 22 is connected to the clutch member 21 intermediate the ends thereof by means of a bolt 25, or the like, in such manner that the lever 21 has relative rocking movement with respect to the pedal 21. In this manner, the pedal 12 may be moved forwardly by pressing of the pedal with the foot and the lever 21 may rock on the bolt or pivot 25 without effecting movement of the plunger 18. The inner or lower end of the lever 21 is adapted to engage against the lower face of the pedal 12 upon forward movement of the lever 21 and the plunger 18 so as to effect automatic release of the clutch 13 as will be hereinafter described.

A valve mechanism, generally designated as 26, is connected to the intake manifold 27 of the motor 11 and is connected to the cylinder or clutch operating member 14 by means of a pipe 28 which connects with the cylinder 14 at the end opposite from the opening 21. This pipe 28 is of relatively flexible construction so that the cylinder 14 may have relative vertical and horizontal movement, as will be hereinafter described.

As disclosed in Figure 2, the valve member 26 comprises an elongated cylindrical member 29 having a cap 30 threadably disposed over one end thereof and a cap 31 disposed across the opposite end. The cylinder 29 is provided with an annular rib 32 intermediate the ends thereof and an intake port 33 is provided intermediate the rib and one end of the cylinder 29, this intake port receiving a connecting pipe 34 which is connected to the manifold 27.

Normally, this connecting pipe 34 will displace the conventional vacuum tank pipe line mounted in the manifold and the vacuum pipe line will be connected to a second port 35 provided in the cylinder 29 oppositely from the intake port 33 so that the operation of the vacuum tank, where such is provided, will not be affected by the operation of this device.

A valve 36 seats on the rib or valve seat 32 and is constantly urged toward its seat by means of a spring 37, which spring engages against the inner wall of the cap 30. A stem 38 is carried by the valve 36 and is provided with an axially disposed bore 39 extending entirely through the valve stem 38 and communicating at the outer end with the atmosphere so as to permit air to pass through the bore 39 and into the air chamber 40 provided intermediate the valve seat 32 and the cylinder head 30.

A threaded sleeve 41 is threadably disposed in the outer end of the valve steam 38 and is provided at the inner end thereof with a valve seat 42 having a passage 43 therethrough which is closed by means of a spherical valve member 44. This valve member 44 is constantly urged toward its seat by means of a spring 45 mounted in an enlarged bore 46 in the stem 38. The sleeve member 41 has an axially disposed bore 47 therethrough which is restricted, as at 48, at the outer end of the sleeve 41 and this sleeve 41 is provided with an enlarged nut or head 49 at the outer end, which may be knurled or otherwise provided with means whereby it may be adjusted longitudinally of the stem 38 so as to tension the spring 45.

A lever 50 is pivotally carried by a bracket 51, which is mounted on the cylinder 29 intermediate the cap 31 and the end of the cylinder 29. This lever 50 has one end 52 overlying the air passage 48 in the sleeve 41 so as to close this passage 48 when the lever 50 is rocked forwardly toward the valve stem 38. The opposite end of the lever 50 is forked, as at 53, and the throttle rod 15 is disposed within this forked end 53 and has relative sliding movement therein. A tubular member 54 is secured to the throttle rod 15 and a spring 55 is disposed within this sleeve or tube 54 and engages against a ball 56 carried by the rock arm 16. This sleeve 54 has a longitudinally disposed slot 57 therein which opens at one end of the sleeve 54 and terminates at the opposite end intermediate the opposite end of the sleeve 54. The rock arm 16 has relative movement within the slot 57. A cotter pin 58 is disposed across the outer end of the sleeve 54 and is adapted to maintain the spring 55 into engagement with the ball 56 of the rock arm 16. The inner end of this sleeve 54 is adapted to engage against the forked end 53 of the lever 50 so as to constantly urge the upper end 52 of the lever 50 into engagement with the outer end of the stem 38, thereby closing the bore in this stem.

As disclosed in Figure 6, I have shown a modified form of a valve 36' having a stem 38' provided with an axially disposed bore 39'. This valve 36' has a relatively small passage 59 therethrough communicating with the bore 39' of the valve stem 38' and a tapering valve member 60 is connected to the upper end of the rock lever 50' and is adapted to have engagement with the bore 59, the peripheral edges of which form a valve seat for the tapering valve 60. The cylinder or clutch operating member 14 is provided with a U-shaped member 61 at the lower end thereof which is rockably connected to a hook-shaped bracket 62 having a base plate 63 which is mounted on a U-shaped clamp 64. This clamp 64 is secured to the channel frame 10 by means of bolts 65, or the like, and the base plate 63 of the bracket 62 has relative horizontal swinging movement with respect to the clamp 64 and the clutch operating member 14 has vertical swinging movement on the bracket or support 62 so that as the clutch pedal 12 is rocked by means of the movement of the plunger 18, the cylinder 14 may also rock therewith. In this manner, there will be no binding action upon rocking of the clutch pedal 12.

In the operation of this device, the valve member 26 is connected to the manifold 27 by means of the connecting pipe 34 and the thumb screw or sleeve 41 is so adjusted that the spring 45 will be tensioned to the desired degree so as to permit the entrance of air into the air chamber 40 and the connecting pipe 28, as the connecting spring 13' for returning the clutch pedal 12 rocks this pedal upwardly and coactively draws the plunger 18 toward the upper end of the cylinder 14. The valve seat 42 is provided with a lateral passage or bleeder opening 66 by means of which air is permitted to pass by the valve member 44 when this valve member is seated on the valve seat 42 so that the gradual upward movement of the plunger 18 will be effected. In this manner, when the throttle rod 15 is pushed inwardly so as to open the throttle, the spring 37 will return the valve 36 to its seat 32 and the spring 45 will return the valve 44 to its seat 42, thereby closing off the suction through the suction pipe 34. The bleeder opening 66 will permit a small quantity of air to pass through the valve stem bore 39 and the pipe 28 to the cylinder 14 so as to effect the gradual upward movement of the plunger 18. A spring 67 is connected at one end to the bracket 51 and at the opposite end to the lever 50 so as to move this lever 50 into released position and carry the upper end 52 away from the outer end of the valve stem 38, thereby opening the passage 39 to the atmosphere through the bore 48. Through the provision of the valve structure shown in Figure 2, when the throttle 15 is moved into open position, the spring 67 will swing the valve operating lever 50 so that the upper end portion 52 of this lever will be disposed away from the adjacent end of the valve member 38, thereby permitting air to freely pass through the opening 48 and the bore 39. The cylinder 14 will be substantially evacuated of air at the side opposite from the gland or bearing 20 and the tension of the spring 45 is such that the atmospheric pressure will initially unseat the valve 44 and permit a sudden inrush of air into the connecting pipe 28 so that the piston 18 will move rapidly under the action of the clutch engaging spring 13' until the pedal 12 initially reaches the clutch engaging position. At this point, the spring 45 will cause the valve 44 to engage the seat 43 and air is thereafter permitted to enter the bore 39 of the valve stem 38 only through the bleeder opening 66, thereby preventing the clutch from taking hold suddenly as would be the case where the pedal cushioning means herein disclosed is not used. It will, therefore, be obvious that the pedal 12 is permitted to rapidly swing rearwardly under the action of the spring urging the pedal constantly into engaging position for that portion of the movement of the pedal termed the idling cycle and the balance of the swinging pedal termed the clutch engaging cycle is cushioned by providing the slow passage of air through the bleeder opening 66. This movement is also effected through the valve shown in Figure 6.

In the modification shown in Figure 6, when the lever 50' is rocked, as hereinbefore described, the movement of this lever will move the valve 60 away from its seat within the valve stem 38' and the tapering of this valve 60 is such as to permit a faster return of the plunger 18 than is permitted by the preferred embodiment of this invention. The length of the valve stem 68 of the valve 60 is such as to permit the upper end 52' of the lever 50' to engage against the valve stem 38' so that the valve 60 will be seated at the same time the upper end 52' engages against the outer end of the valve stem 38, thereby eliminating any binding action of the tapering valve 60 on its seat.

It will be obvious, from the foregoing, that a relatively simple but at the same time practical device has been disclosed which may be readily mounted on the present parts of a motor vehicle without disturbing the parts of the vehicle but which will effect a complete release of the clutch through operation of the clutch pedal automatically upon release of the throttle rod. It is also obvious that this device will not effect any of the workings of the present parts of the vehicle.

The construction of the clutch operating mechanism herein disclosed is such that all of the component parts thereof may be constructed of standard equipment or parts which facilitate the construction of the device and make it possible to manufacture the device at a relatively cheap cost. This use of standard equipment or material will make it unnecessary to cast or otherwise form the component parts of the device from special molds, dies or the like.

In the operation of this device, when the plunger 18 is drawn inwardly of the cylinder 14 by the suction of the motor 11, the clutch is moved into released position and upon depression of the carbureter throttle or foot throttle 15, the vehicle, where the device is mounted on a motor vehicle, may be started from either a standing or inert position without jerking of the car or vehicle through clutching of the clutch mechanism. It is, of course, understood that this declutching mechanism will operate equally as well while the vehicle is in motion and while the transmission is in either high or any of the intermediate gears.

It is, of course, understood that various changes and modifications may be made in the details of construction and design of the above specifically described embodiment of this invention without departing from the spirit thereof, such changes and modifications being restricted only by the scope of the following claims.

What is claimed is:

1. A free wheeling attachment comprising a cylinder, a piston slidable in the cylinder, a rock lever, means for pivotally mounting the rock lever on a clutch pedal, means pivotally connecting the lever with the piston whereby the clutch pedal will be rocked upon movement of the piston in one direction while permitting independent movement of the pedal in the same direction, and operating means connected to the cylinder and the suction of a vehicle engine for movement of the piston in said one direction.

2. A free wheeling attachment comprising a cylinder, a piston slidable in the cylinder, a rock lever, means engaging the rock lever intermediate the ends to pivotally mount the lever on a clutch pedal, means pivotally connecting the lever with the piston whereby to rock the clutch pedal upon movement of the piston in one direction while permitting independent movement of the pedal in the same direction, and operating means connected to the cylinder and the suction of a vehicle engine to move the piston in said one direction.

3. A free wheeling attachment comprising a cylinder, a piston slidable in the cylinder, an L-shaped rock lever, means engaging one leg of said lever and a clutch pedal to pivotally mount the lever on the pedal, the other leg of the lever engaging the pedal, a connecting link connecting said one leg of the lever with the piston, and piston operating means connected to the cylinder and the suction of a vehicle engine to move the piston in one direction, said lever means being so disposed with respect to the pedal as to permit independent movement of the pedal in said one direction.

4. A free wheeling attachment comprising a cylinder, a piston slidable in the cylinder, a rock lever, means engaging the lever intermediate the ends thereof and a clutch pedal to pivotally mount the lever on the pedal, means for mounting the cylinder on a vehicle frame, and means connecting the cylinder with the suction of a vehicle engine to move the piston in one direction.

5. A free wheeling means comprising a cylinder, a piston slidable in the cylinder, means connecting the piston with a spring returned clutch pedal, means connecting the cylinder with the intake manifold of an internal combustion engine, a valve interposed in said second connecting means, and valve operating means engaging the valve and the throttle of the engine, said valve comprising a housing interposed in said connecting means, a valve seat in the housing, a valve member having a bore therethrough, a spring for constantly urging the valve into closed position, a valve seat within the bore having a bleeder opening, a valve for the second seat, and a spring constantly urging the second valve into closed position, said second spring having a tension to release said piston and clutch pedal for free swinging movement through its idle cycle and to retard the movement of the pedal in its engaging cycle.

6. A free wheeling means comprising a cylinder, a piston in the cylinder, means connecting the piston with a clutch pedal, a pipe connecting the cylinder on one side of the piston with the intake manifold of an internal combustion engine, a valve interposed in the pipe, a valve operating lever, means for mounting the lever in a position for engagement by one end thereof with the valve, means constantly urging the lever away from the valve, and means connecting the valve with the throttle mechanism for movement thereby, said valve comprising a housing, a valve seat in the housing, a slidable valve having a bore therethrough, a spring urging the valve into closed position, a second valve within the slidable valve, a valve seat for the second valve, said seat having a bleeder passage, and a spring urging the second valve to its seat, said latter spring having a tension such that upon closing of the slidable valve, said second valve will be forced into open position by inrushing air entering the cylinder through the pipe whereby to permit quick return of the clutch pedal to clutch engaging position, said bleeder passage upon seating of the second valve permitting entrance of a small quantity of air to said cylinder whereby the clutch pedal will be slowly swung into complete engaging position.

7. A free wheeling means comprising a spring returned clutch pedal operating means, means connecting the operating means with a clutch pedal, means connecting the operating means with the intake manifold of an internal combustion engine, a valve interposed in said second connecting means and valve operating means engaging the valve and the throttle of the engine, said valve comprising a housing interposed in said connecting means, a valve seat in the housing, a valve member having a bore therethrough, a spring constantly urging the valve into closed position, a second valve within the bore having a bleeder opening communicating with the atmosphere, a valve for the second seat, and a spring constantly urging the second valve into closed position, said second spring having a tension to release the pedal operating means and clutch pedal for free swinging movement through its idle cycle and to retard the movement of the pedal in its engaging cycle.

8. A declutching means for an internal combustion engine comprising a clutch pedal operating means, a rock lever pivotally carried by the operating means, means for pivotally mounting the lever intermediate the ends thereof on the clutch pedal, a throttle control means, a pipe connecting the operating means with the intake manifold of the engine, means connecting the operating means with a spring operated clutch pedal movable in an idling cycle and a clutching cycle, and means interposed in the pipe and engaging the throttle control to release the pedal for fast swinging movement during its idle cycle, said latter means including tensionable means, a valve seat threadably carried by said latter means, and a valve movable into closed position against said seat upon completion of the idle cycle to retard the movement of the pedal during the clutching cycle.

9. A free wheeling means comprising a spring operated clutch pedal operating means, means connecting the operating means with a clutch pedal movable in an idle cycle and a clutching cycle, means connecting the operating means with the intake manifold of an internal combustion engine, a valve interposed in said connecting means and a valve operating means engaging the valve and the throttle of the engine, said valve comprising a housing interposed in said connecting means, a valve seat in the housing, a valve member engaging said seat, a spring for constantly urging the valve into closed position, a second seat within the housing and movable relative thereto, said second seat having a bleeder opening communicating with the atmosphere, a valve for the second seat, and a spring constantly urging the second valve into closed position, said second spring being tensionable upon adjustment of said second seat and having a tension to release said operating means and clutch pedal for free swinging movement through its idle cycle and to retard the movement of the pedal in its engaging cycle.

10. A free wheeling means comprising a spring operated clutch pedal operating means, means connecting the operating means with a clutch pedal, means connecting the operating means with the intake manifold of an internal combustion engine, a valve interposed in said second connecting means, and valve operating means engaging the valve and the throttle of the engine, said valve comprising a housing interposed in said connecting means, a valve seat in the housing, a valve member engaging the seat, a spring constantly urging the valve into closed position, a second seat adjustable relative to the housing, means operable exteriorly of the housing for adjusting said second seat, said second seat having a bleeder opening communicating with the atmosphere, a valve for the second seat, and a spring constantly urging the second valve into closed position and being tensionable upon adjustment of said second valve seat to release said operating means and clutch pedal for free swinging movement to its idle cycle and to retard the movement of the pedal in its engaging cycle.

11. A free wheeling attachment for a spring operated clutch pedal movable in an idle cycle and a clutching cycle comprising a suction operated pedal operating member, a throttle control means, a pipe connecting the member with the intake manifold of an internal combustion engine, a rock lever connecting the operating member with the pedal and means interposed in the pipe and engageable with the throttle control means for permitting the return of the pedal at varying speeds, said latter means including a valve movable into open position coactive with the movement of the throttle control means in one direction, and automatic means operable after movement of the valve into closed position and movement of the throttle control means in the opposite direction to release the pedal for free swinging movement during the idle cycle and to retard the movement of the pedal during the clutching cycle.

12. A free wheeling means for a spring operated clutch pedal movable in an idle cycle and a clutching cycle comprising a suction operated pedal operating member, a rockable means connecting the operating member with the pedal to permit independent movement of the pedal in one direction, a throttle control means, a pipe for connecting the member with the intake manifold of an internal combustion engine, means interposed in the pipe and engageable with the throttle control means for permitting the return of the pedal at varying speeds, said latter means including a valve movable into open position coactive with the movement of the throttle control means in one direction, automatic means operable after movement of the valve into closed position and movement of the throttle control means in the opposite direction to release the pedal for free swinging movement during the idle cycle and to retard the movement of the pedal during the clutching cycle, and means for adjusting said automatic means to control the point in the return movement of the pedal at which the speed is varied.

13. A free wheeling means comprising a suction actuated clutch pedal operating means, a rock lever pivotally carried by the operating means, means for pivotally mounting the lever intermediate the ends thereof on the clutch pedal, a throttle control means, a pipe connecting the operating means with an intake manifold, and means interposed in the pipe and engaging the throttle control means to release the pedal for quick swinging movement during its idle cycle, said latter means including means active after the pedal has completed its idle cycle to retard the swinging of the pedal during its clutching cycle.

14. A declutching means for an internal combustion engine comprising a clutch pedal operating means, a rock lever pivotally carried by the operating means, means for pivotally mounting the lever intermediate the ends thereof on the clutch pedal, a throttle control means, a pipe connecting the operating means with the intake manifold of the engine, means connecting the operating means with a spring pressed clutch pedal movable in an idling cycle and a clutching cycle, and means interposed in the pipe and engaging the throttle control to release the pedal for fast swinging movement during its idle cycle, said latter means including a spring pressed valve movable into closed position upon completion of the idle cycle to retard the movement of the pedal during the clutching cycle.

15. A free wheeling means comprising a cylinder, a piston slidable in the cylinder, a connecting rod extending from one end of said piston, a rock lever pivotally mounted on said rod, means for pivotally mounting the lever intermediate the ends thereof on a spring operated clutch pedal, a throttle controlling means, a pipe connecting the cylinder with an intake manifold and means interposed in the pipe and engaging the throttle control to release the pedal for quick swinging movement during its idle cycle, said latter means including means active after the pedal has completed its idle movement to retard the swinging of the pedal during its clutching cycle.

16. In an automotive vehicle provided with a clutch, a clutch operating member, an intake manifold and an accelerator, power means for operating the clutch comprising a pressure differential operated motor, force transmitting means interconnecting the power element of said motor with the clutch operating member, a fluid transmitting connection interconnecting the intake manifold with the motor, and valve means for controlling the operation of said motor by controlling the flow of air through said fluid transmitting connection, said means including a valve member operated by the accelerator and operative upon release of the accelerator to interconnect the intake manifold with the motor, thereby decreasing the gaseous pressure within the motor, said valve means also including an accelerator operated bleed valve member movable with respect to said first valve member and operative to control the gaseous pressure within the motor during the clutch engaging operation thereof.

JACK CHRISTIAN.